US011889250B2

(12) United States Patent
Ziemba

(10) Patent No.: US 11,889,250 B2
(45) Date of Patent: *Jan. 30, 2024

(54) NEAR TO THE EAR SUBWOOFER

(71) Applicant: Panasonic Automotive Systems Company of America, Division of Panasonic Corporation of North America, Peachtree City, GA (US)

(72) Inventor: Mark William Ziemba, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,528

(22) Filed: Mar. 31, 2023

(65) Prior Publication Data

US 2023/0254615 A1 Aug. 10, 2023

Related U.S. Application Data

(63) Continuation of application No. 17/752,390, filed on May 24, 2022, now Pat. No. 11,647,316, which is a continuation of application No. 17/156,840, filed on Jan. 25, 2021, now Pat. No. 11,375,303.

(60) Provisional application No. 62/963,793, filed on Jan. 21, 2020.

(51) Int. Cl.
*H04R 1/02* (2006.01)

(52) U.S. Cl.
CPC ......... *H04R 1/025* (2013.01); *H04R 2499/13* (2013.01)

(58) Field of Classification Search
CPC ............................ H04R 1/025; H04R 2499/13
USPC ............................................................ 381/86
See application file for complete search history.

(56) References Cited

U.S. PATENT DOCUMENTS

| | | | | | |
|---|---|---|---|---|---|
| 5,687,246 | A * | 11/1997 | Lancon | B60R 11/0217 | |
| | | | | 381/338 | |
| 7,130,440 | B2 * | 10/2006 | Maekawa | H04R 5/023 | |
| | | | | 381/86 | |
| 8,325,938 | B2 * | 12/2012 | Yokota | H04M 9/082 | |
| | | | | 381/71.4 | |
| 9,100,749 | B2 * | 8/2015 | Hartung | H04R 1/403 | |
| 2017/0055078 | A1 * | 2/2017 | Christoph | H04R 1/025 | |

(Continued)

*Primary Examiner* — Sean H Nguyen
(74) *Attorney, Agent, or Firm* — Laurence S. Roach, Esq.

(57) ABSTRACT

A loudspeaker arrangement for a seat within a motor vehicle utilizes one or more localized sound output ports for low frequency sound reproduction. A housing, such as an enclosure, substantially surrounds a loudspeaker. One or more audio transmission line channels acoustically interconnect the interior of the enclosure to one or more sound output ports. The enclosure is situated below, behind, or in some fixed location around or within a vehicle seat. The sound outputs ports are situated at or near a headrest such that the output ports are located substantially less than a wavelength of sound at the highest operating frequency from either ear of the seat's occupant. The acoustic response and resonances of a 1) rear enclosure, 2) a front vented enclosure, 3) a loudspeaker, and 4) an audio transmission path from the enclosure to one or more output ports are used to provide localized low frequency sound reproduction.

20 Claims, 4 Drawing Sheets

(56) References Cited

U.S. PATENT DOCUMENTS

2017/0088266 A1* 3/2017 Tracy ............... B64D 11/00154

* cited by examiner

NEAR TO THE EAR SUBWOOFER

CROSS-REFERENCED TO RELATED APPLICATIONS

This application is a continuation of U.S. patent application Ser. No. 17/752,390, filed on May 24, 2022, which is currently under allowance, which claims benefit of U.S. patent application Ser. No. 17,156,840, filed on Jan. 25, 2021, which is now U.S. Pat. No. 11,375,303, issued on Dec. 2, 2021, which claims benefit of U.S. Provisional Application No. 62/963,793 filed on Jan. 21, 2020, the disclosure of which are hereby incorporated by reference in their entirety for all purposes.

BACKGROUND OF THE INVENTION

1. Field of the Invention

The present invention relates to an audio system in a motor vehicle.

2. Description of the Related Art

The nature of vehicle acoustics produces compromised performance in even the most carefully designed sound systems. Efforts to create a smooth, impactful audio performance for vehicle occupants are negatively influenced by size, placement, and transfer characteristics between the speakers and the occupants in this complex space.

A drawback of known audio systems is that the output of a speaker can be optimized for only one location creating sub-optimal conditions at other listening locations served by common loudspeakers.

Studies have shown that placing speakers near the occupant's ear can overcome the effects of location, but this creates additional problems. The existence of physically large speakers near the occupant's head can be unsafe for reasons of visibility and crash safety.

Active noise cancellation (ANC) is an important feature of modern audio systems, wherein the same speakers used for sound reproduction are also utilized for cabin noise compensation. ANC is typically implemented by using door speakers originating 18 to 48 inches away from the listener's ears or from a subwoofer located as far as 100 inches away. These long distances create inherent timing issues and suboptimal acoustic transfer characteristics that are difficult to overcome. Additionally, these typical ANC implementations rely on high acoustic output to achieve an appropriate sound level to cancel noise at the listener's ear. The acoustic output of such systems is typically high enough to induce modal excitation in the acoustic space of the vehicle cabin, thus making effective noise cancellation more difficult.

Prior art inventions use small headrest loudspeakers. Due to their small size, these lack the extended low frequency needed for both performance audio and active noise cancellation. The typical workaround is to use the larger existing door speakers to supplement the frequency response of the small headrest speakers to reproduce the necessary bass in the desired personal location, and to use DSP processing to cancel the resultant bass at other listening locations. Not only is this quite complicated as a result of the multiple path length variations from speakers to occupants, but it is prone to inaccuracy and instability as a compromise. Therefore, the need for rendering low frequency content specific and exclusive to each seat creates a key requirement to more precisely place said low frequency content in the vicinity of the occupant's head.

SUMMARY OF THE INVENTION

The invention comprises, in one form thereof, a loudspeaker arrangement for a motor vehicle with the arrangement comprising of: a seat enhanced with one or more localized sound output ports for low frequency sound reproduction; a housing, such as an enclosure substantially surrounding a loudspeaker such that sound from the loudspeaker is emitted directly into the interior of the enclosure; and one or more audio transmission line channels acoustically interconnecting the interior of the enclosure to the one or more sound output ports. The enclosure may be situated below, behind, or in some fixed location around or within the seat at some distance of at least six inches away from the output ports. The location of the sound outputs ports may be situated at or near a seat headrest, such that the output ports are substantially less than a wavelength of sound at the highest operating frequency from either ear of the seat's occupant. In the preferred embodiment, the invention uses the acoustic response and resonances of the 1) rear enclosure, 2) the front vented enclosure, 3) loudspeaker parameters, and 4) audio transmission path from the enclosure to the output ports.

The invention comprises, in another form thereof, a loudspeaker arrangement with a similar configuration as described in the embodiment in the immediately preceding paragraph, except that two loudspeakers are used in place of one. This includes configurations such as push-pull, isobaric, mono, or stereo combinations of two loudspeakers utilized in coherent or non-coherent summation.

The invention comprises, in another form thereof, a loudspeaker arrangement with a similar configuration as described in the embodiment in the immediately preceding paragraph, except that two discrete units are used in a stereo configuration.

The invention comprises, in another form thereof, a method for providing audio infotainment in a motor vehicle, involving the use of any of the aforementioned forms.

The invention delivers high output, low distortion bass close to the listener's ears to minimize the excitation of the acoustic space of the vehicle's cabin. Thus the negative, variable impact of the vehicle's acoustics upon the occupant's listening experience is reduced.

The invention may enable one individual listener to enjoy a personal choice of music, speech, or phone conversation with the least amount of acoustic disturbance to other passengers. This is achieved primarily by the close acoustic proximity to the listener's ears of the acoustic output of the invention.

This invention may be optimized for each individual listening location (e.g., each single occupant seat).

The speaker enclosure is mounted away from the occupant's head which allows for greater safety and provides a more flexible use of alternate space.

Because the output of the device is in the vehicle seat, when the seat is moved backward or forward for the comfort of the occupant, the output of the invention stays consistent since the output moves with the occupant's seat (and ears).

The invention may also use digital signal processing (DSP) to equalize and compensate for signals from other speakers that are farther away.

The invention may accomplish active noise cancellation with smaller distances between the speakers and the listener, and without the significant drawbacks of the conventional technology used today.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
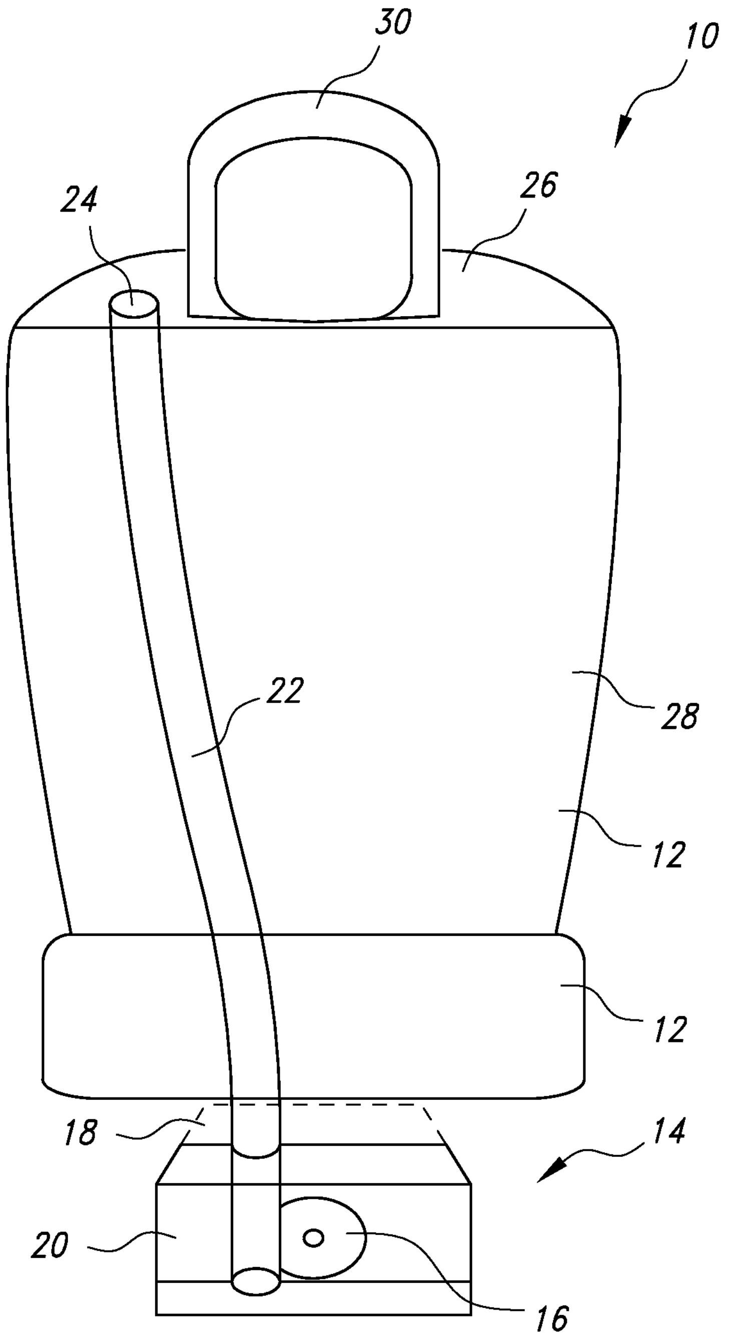
FIG. 1 is a schematic diagram of one embodiment of a vehicle loudspeaker arrangement of the present invention.

FIG. 1 illustrates one embodiment of a vehicle loudspeaker arrangement 10 of the present invention including a rear view of a passenger seat 12. A loudspeaker apparatus 14 is disposed below seat 12 and includes a loudspeaker component in the form of a woofer 16, a rear sealed enclosure 18, and a front vented enclosure 20. Enclosures 18, 20, and possibly a floor of the vehicle, may conjunctively form an enclosure around and surrounding woofer 16.

Audio transmission line vents 22*a-b* provide enclosed air conduits or pathways interconnecting an interior of apparatus 14 with respective sound outputs 24*a-b* at a top end 26 of a backrest 28 of seat 12. A headrest 30 is disposed between sound outputs 24*a-b*. Sound output 24*a* is close (e.g., 4 to 6 inches away) to the left ear of a passenger sitting in seat 12, and sound output 24*b* is close (e.g., 4 to 6 inches away) to the right ear of a passenger sitting in seat 12.

During use, transmission line vents 22*a-b* may carry sound produced by woofer 16 to sound outputs 24*a-b* with as little change and/or distortion as possible. It is also possible for the change in sound and/or distortion due to transmission line vents 22*a-b* to not be minimized, but rather to be taken into account in the audio signal that is transmitted to woofer 16.

The enclosure around woofer 16 and transmission line vents 22*a-b* may be soundproof to the extent that the sound from woofer 16 may be heard only through sound outputs 24*a-b*.

Figure 2:
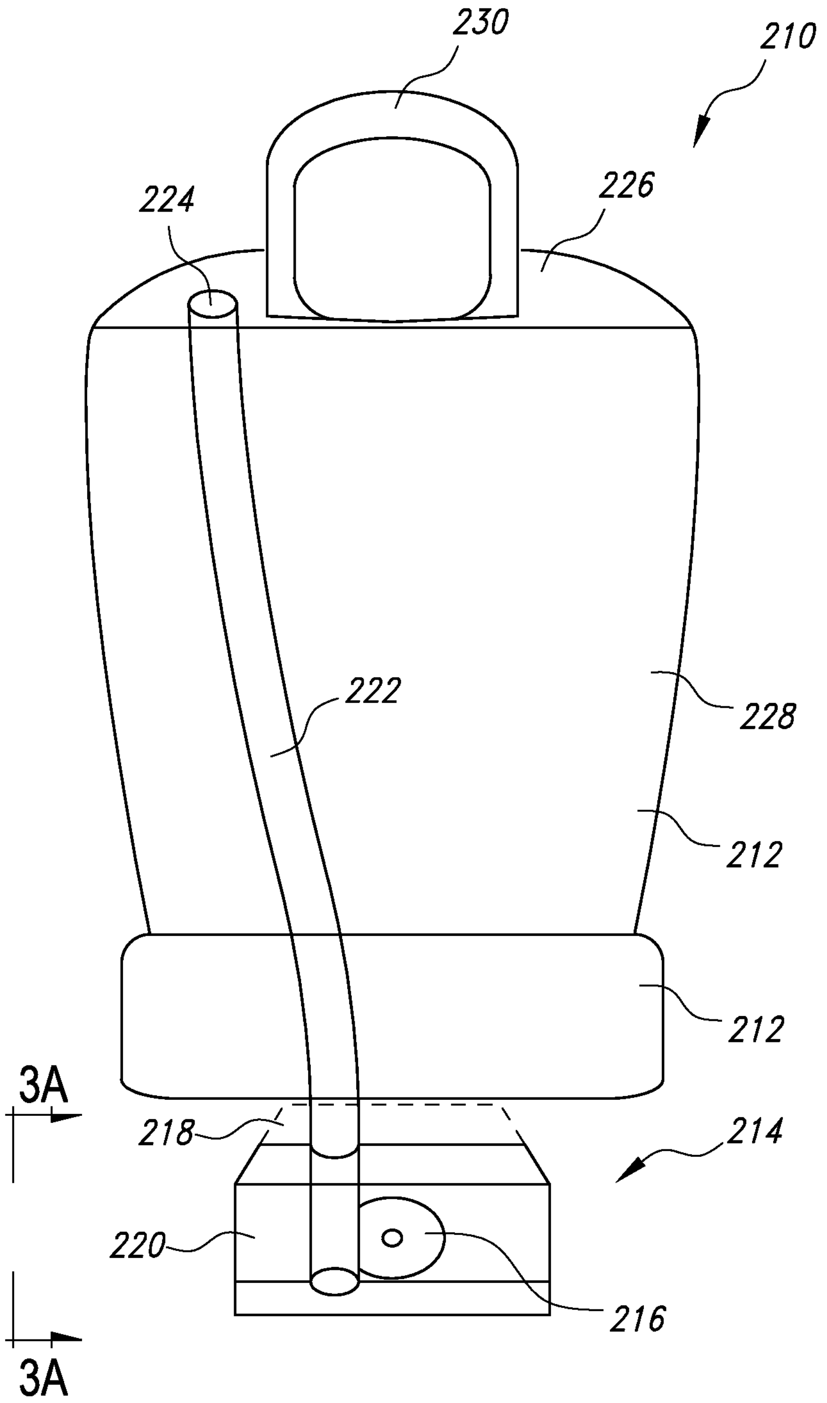
FIG. 2 is a schematic diagram of another embodiment of a vehicle loudspeaker arrangement of the present invention.

FIG. 2 illustrates another embodiment of a vehicle loudspeaker arrangement 210 of the present invention including a rear view of a passenger seat 212. A loudspeaker apparatus 214 is disposed below seat 212 and includes a loudspeaker component in the form of a woofer 216, an optional rear sealed enclosure 218, and a front vented enclosure 220. Enclosures 218, 220, and possibly a floor of the vehicle, may conjunctively form an enclosure around and surrounding woofer 216.

Audio transmission line vent 222 provides an enclosed air conduit or pathway interconnecting an interior of apparatus 214 with a sound output 224 at a top end 226 of a backrest 228 of seat 212. A headrest 230 is disposed adjacent to sound output 224. Sound output 224 may be close (e.g., 4 to 6 inches away) to the left ear of a passenger sitting in seat 212.

During use, transmission line vent 222 may carry sound produced by woofer 216 to sound output 224 with as little change and/or distortion as possible. It is also possible for the change in sound and/or distortion due to transmission line vent 222 to not be minimized, but rather to be taken into account in the audio signal that is transmitted to woofer 216.

The enclosure around woofer 216 and transmission line vent 222 may be soundproof to the extent that the sound from woofer 216 may be heard only through sound output 224.

Figure 3A:
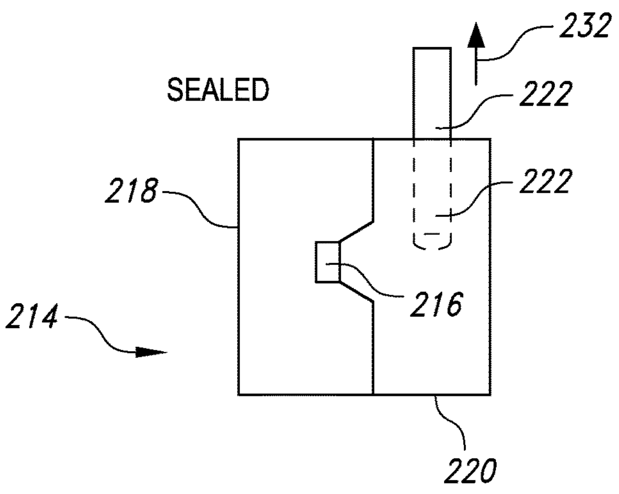
FIG. 3A is a schematic view of the loudspeaker apparatus of FIG. 2 along line 3A—3A.

FIG. 3A illustrates loudspeaker apparatus 214 of FIG. 2 along line 3A-3A. The enclosure is sealed, and the sound propagates up vent 222 in direction 232.

Figure 3B:
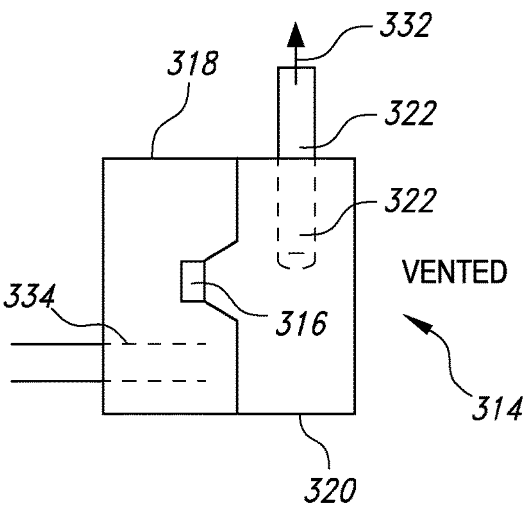
FIG. 3B is a schematic side view of another embodiment of a loudspeaker apparatus of the present invention.

FIG. 3B illustrates another embodiment of a loudspeaker apparatus 314 of the present invention including a woofer 316, a rear vented enclosure 318, and a front vented enclosure 320. Enclosures 318, 320, and possibly a floor of the vehicle, may conjunctively form an enclosure around and surrounding woofer 316. The sound propagates up vent 322 in direction 332. A transmission line vent 334 may provide an air pathway between an interior of enclosure 318 and ambient air for tuning purposes.

Figure 3C:
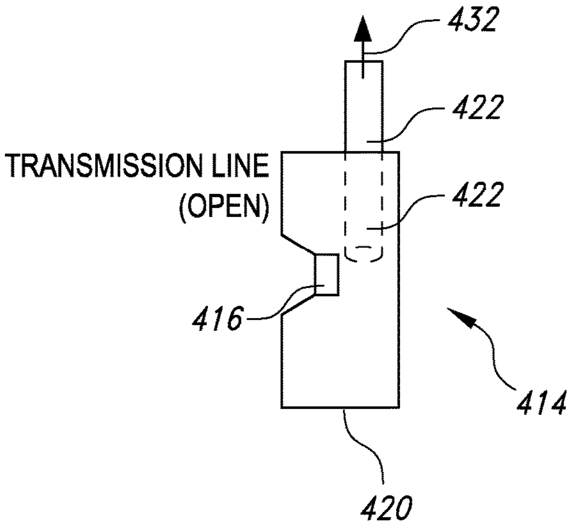
FIG. 3C is a schematic side view of yet another embodiment of a loudspeaker apparatus of the present invention.

FIG. 3C illustrates yet another embodiment of a loudspeaker apparatus 414 of the present invention. Apparatus 414 is substantially similar to apparatus 214 except that apparatus 414 does not include a rear enclosure, but rather is open. Another difference is that woofer 416 faces in the opposite direction as woofer 216, which is arbitrary because woofers 216, 416 both emit sound in two opposite lateral directions (e.g., the facing direction and the direction opposite to the facing direction) substantially equally. The sound propagates up vent 422 in direction 432.

Figure 3D:
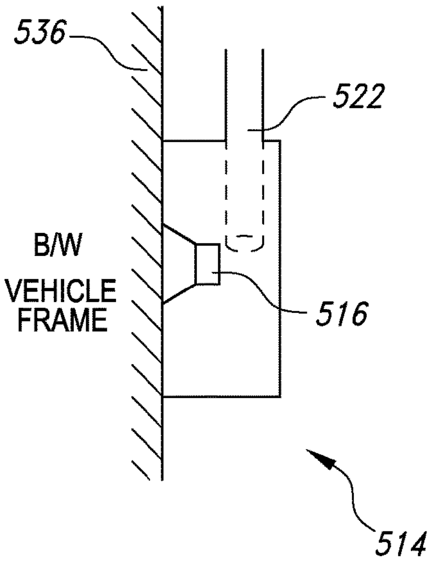
FIG. 3D is a schematic side view of still another embodiment of a loudspeaker apparatus of the present invention.

FIG. 3D illustrates still another embodiment of a loudspeaker apparatus 514 of the present invention. Apparatus 514 is substantially similar to apparatus 414 except that, instead of being open, apparatus 514 may be attached to, and may emit sound directly into, a vehicle frame 536. Apparatus 514 may be attached to frame 536 during a "body in white" (BIW) stage of vehicle assembly. The sound also propagates up vent 522 from woofer 516.

Figure 3E:
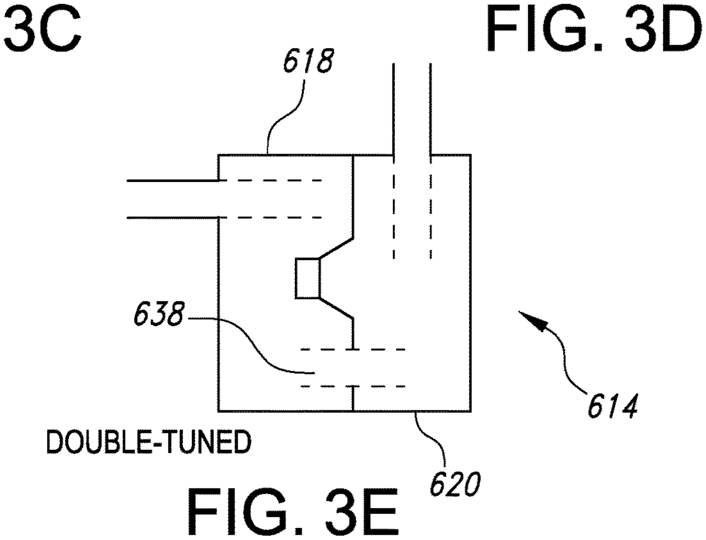
FIG. 3E is a schematic side view of a further embodiment of a loudspeaker apparatus of the present invention.

FIG. 3E illustrates a further embodiment of a loudspeaker apparatus 614 of the present invention. Apparatus 614 is substantially similar to apparatus 314 except that enclosures 618, 620 are fluidly interconnected by an air pathway provided by a transmission line vent 638 to achieve double tuning.

Figure 4:
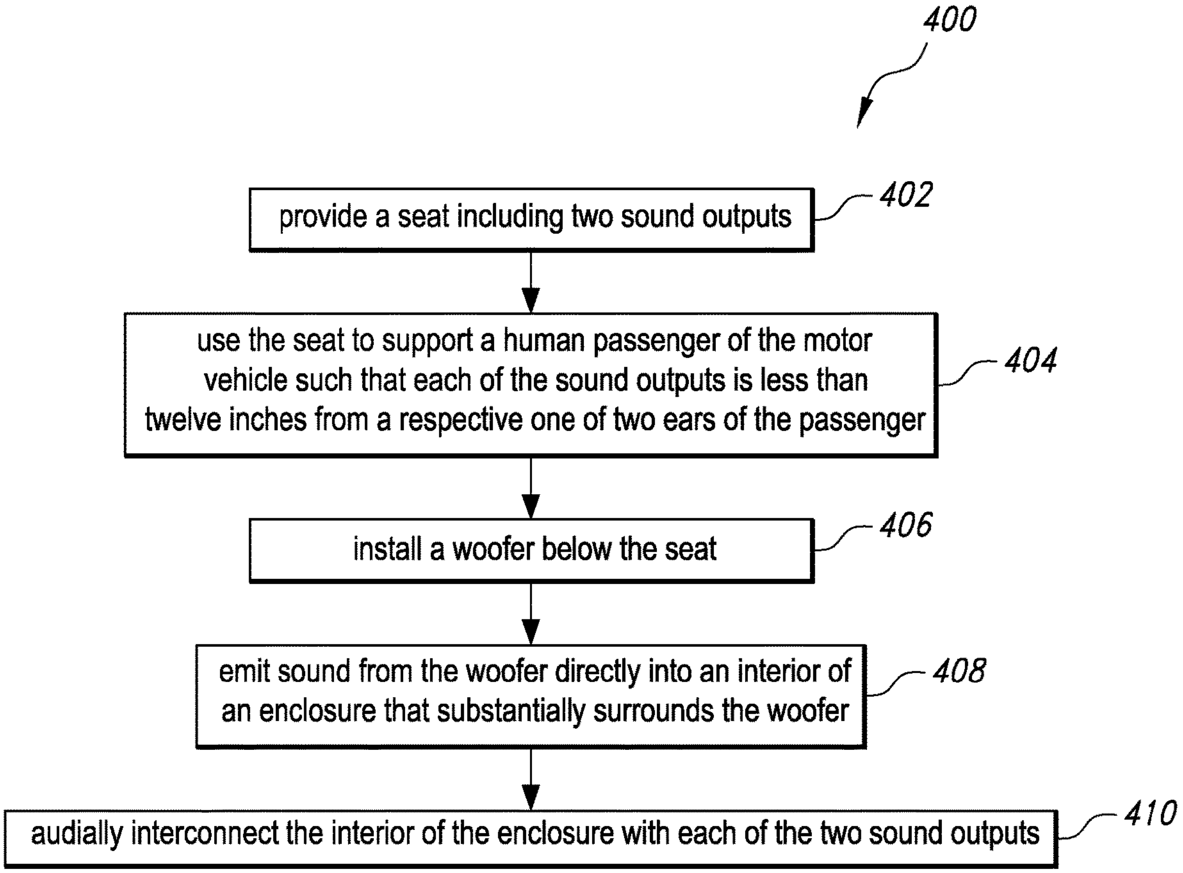
FIG. 4 is a flow chart of one embodiment of a method of the invention for providing audio infotainment in a motor vehicle.

FIG. 4 illustrates one embodiment of a method 400 of the invention for providing audio infotainment in a motor vehicle. Although a particular order of steps is illustrated, the embodiment of the invention is not limited to the steps being in any particular time sequential order. In a first step 402, a seat including two sound outputs is provided. For example, seat 12 includes sound outputs 24*a-b*.

In a next step 404, the seat is used to support a human passenger of the motor vehicle such that each of the sound outputs is less than twelve inches from a respective one of two ears of the passenger. For example, when a human passenger sits in seat 12, sound output 24*a* is 4 to 6 inches away from the left ear of the passenger, and sound output 24*b* is 4 to 6 inches away from the right ear of the passenger.

Next, in step 406, a woofer is installed below the seat. For example, woofer 16 may be installed below seat 12.

In step 408, sound is emitted from the woofer directly into an interior of an enclosure that substantially surrounds the woofer. For example, sound may be emitted from woofer 16 directly into an interior of an enclosure that is defined by enclosures 18, 20, and a floor of the vehicle. The enclosure may substantially surround woofer 16.

In a final step 410, the interior of the enclosure is audially interconnected with each of the two sound outputs. For example, the interior of the enclosure defined by enclosures 18, 20, and a floor of the vehicle may be audially interconnected with each of two sound outputs 24*a-b* by audio transmission line vents 22*a-b*.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A loudspeaker arrangement for a motor vehicle, the arrangement comprising:

a seat including a backrest and one or more sound output ports for sound reproduction;

one or more loudspeakers situated within the seat at least six inches away from the one or more sound output ports;

an enclosure substantially surrounding the loudspeaker(s) such that sound from the loudspeaker(s) is emitted into an interior of the enclosure; and one or more audio transmission channels each extending out of the enclosure and through the backrest of the seat, and acoustically interconnecting the interior of the enclosure to the one or more sound output ports.

2. The arrangement of claim 1, wherein the arrangement utilizes multiple loudspeakers in a discrete stereo or mono configuration.

3. The arrangement of claim 1, wherein the arrangement utilizes multiple loudspeakers in coherent or non-coherent summation alignments such as isobaric or push-pull configurations.

4. The arrangement of claim 1, wherein the audio transmission channels comprise substantially hollow conduits.

5. The arrangement of claim 1, wherein the audio transmission channels comprise partially occluded conduits with damping material.

6. The arrangement of claim 1, wherein the enclosure is substantially soundproof.

7. A method for providing cross-seat audio cancellation, utilizing the arrangement of claim 1, including cancelling discrete audio playing in adjacent seats, the cancelling including digital signal processing (DSP).

8. A loudspeaker arrangement for a motor vehicle having a frame, the arrangement comprising:

a seat including at least one sound output, the seat being configured to support a human passenger of the motor vehicle;

a loudspeaker component disposed below the at least one sound output;

a housing substantially surrounding the loudspeaker component in conjunction with the frame of the motor vehicle such that sound from the loudspeaker component is emitted into the frame; and at least one audio transmission line vent disposed in the seat, each said audio transmission line vent being configured to carry sound emitted by the loudspeaker component to a respective said sound output.

9. The arrangement of claim 8, wherein the seat includes a top end and a headrest attached to the top end, the sound output being disposed on the top end.

10. The arrangement of claim 8, wherein the sound output is positioned to be less than six inches from an ear of the passenger.

11. The arrangement of claim 8, wherein the at least one audio transmission line vent comprises a substantially hollow conduit.

12. The arrangement of claim 8, wherein the audio transmission line vent is substantially soundproof except at the sound output.

13. The arrangement of claim 8, wherein the at least one sound output comprises two sound outputs, the sound outputs being at least twelve inches apart.

14. The arrangement of claim 8, wherein at least one of the housing and the loudspeaker is configured to be attached to the frame of the motor vehicle.

15. A loudspeaker arrangement for a motor vehicle, the arrangement comprising:

a seat including a backrest and at least one sound output port, the at least one sound output port being disposed at or near a top of the backrest;

a loudspeaker component disposed below and at least six inches away from the at least one sound output port;

a housing substantially surrounding the loudspeaker component such that sound from the loudspeaker component is emitted into an interior of the housing, the housing including a transmission line vent providing an air pathway between an interior of the housing and ambient air; and at least one audio transmission channel extending out of the housing and through the backrest of the seat, and acoustically interconnecting the interior of the housing to a respective said sound output port.

16. The arrangement of claim 15, wherein the arrangement includes multiple loudspeakers in a discrete stereo or mono configuration.

17. The arrangement of claim 15, wherein the arrangement includes multiple loudspeakers in coherent or non-coherent summation alignments such as isobaric or push-pull configurations.

18. The arrangement of claim 15, wherein the audio transmission channel comprises a substantially hollow conduit.

19. The arrangement of claim 15, wherein the audio transmission channel comprises a partially occluded conduit with damping material.

20. The arrangement of claim 15, wherein the housing includes two enclosures and a transmission line vent providing an air pathway fluidly interconnecting the two enclosures to achieve double tuning.

* * * * *